United States Patent [19]

Koester et al.

[11] 4,201,149
[45] May 6, 1980

[54] APPARATUS FOR SPIN COATING IN THE PRODUCTION OF THIN MAGNETIC LAYERS FOR MAGNETIC DISCS

[75] Inventors: Eberhard Koester, Frankenthal; Paul Deigner, Weisenheim; Roland Falk, Achern; Karl Uhl, Frankenthal; Dieter Schaefer, Ludwigshafen; Dieter Mayer, Ludwigshafen; Herbert Motz, Ludwigshafen; Peter Felleisen, Lampertheim, all of Fed. Rep. of Germany

[73] Assignee: BASF Aktiengesellschaft, Ludwigshafen, Fed. Rep. of Germany

[21] Appl. No.: 946,355

[22] Filed: Sep. 27, 1978

Related U.S. Application Data

[62] Division of Ser. No. 641,356, Dec. 16, 1975, Pat No. 4,133,911.

[30] Foreign Application Priority Data

Dec. 17, 1974 [DE] Fed. Rep. of Germany ....... 2459541

[51] Int. Cl.² ............................................. B05C 11/08
[52] U.S. Cl. ........................................ 118/52; 118/56; 118/320
[58] Field of Search .......... 427/48, 209, 240, 127–132; 118/52–54, 56, 320, 506

[56] References Cited

U.S. PATENT DOCUMENTS

| 2,632,725 | 3/1953 | Marks et al. | 118/52 X |
|---|---|---|---|
| 3,323,491 | 6/1967 | Granick | 118/506 X |
| 3,760,822 | 9/1973 | Evans | 118/52 X |
| 3,870,014 | 3/1975 | Buck | 118/52 |
| 4,031,852 | 6/1977 | Clarke et al. | 118/52 |
| 4,033,288 | 7/1977 | Woellhaf et al. | 118/52 |
| 4,068,019 | 1/1978 | Boeckl | 118/52 X |
| 4,073,262 | 2/1978 | Scheffel et al. | 118/52 |
| 4,096,295 | 6/1978 | Marks | 118/52 X |

OTHER PUBLICATIONS

IBM Techn. Discl. Bulletin, vol. 14, No. 6, Nov. 1971, p. 1908.

Primary Examiner—Harris A. Pitlick
Attorney, Agent, or Firm—Keil & Witherspoon

[57] ABSTRACT

The invention relates to an improved apparatus for the manufacture of magnetic discs carrying very thin magnetic layers, by applying a fluid dispersion of magnetic materials in a binder mixture to rigid base discs by the spin-coating process. Above the side of the base disc which is to be provided with the magnetic layer, there are arranged means which produce an aerodynamic boundary layer above the discs during rotation of the latter. This avoids the formation of surface irregularities and of coating streaks during production of the layer by spin-coating.

4 Claims, 5 Drawing Figures

APPARATUS FOR SPIN COATING IN THE PRODUCTION OF THIN MAGNETIC LAYERS FOR MAGNETIC DISCS

This is a division of application Ser. No. 641,356, filed Dec. 16, 1975, now U.S. Pat. No. 4,133,911.

The present invention relates to an improved apparatus for the manufacture of magnetic discs carrying very thin magnetic layers, by applying a fluid dispersion of magnetic materials in a binder mixture to rigid base discs by the spin-coating process whilst taking special measures to avoid the occurrence of surface irregularities and coating streaks.

Magnetic recording media in the form of rotating discs are extensively used as memories which allow rapid access to any desired position. Two important factors relating to such disc memories are the amount of information which can be stored thereon, which is usually described as the recording density and is expressed in bits per inch, and their magnetic properties, which influence the output signals of the magnetic disc. The achievable recording density depends on the thickness of the magnetic coating. The thinner the coating, the higher the recording density can be. With $6\mu$ magnetic coatings, a recording density of about 1,000 bits per inch is achieved, whilst with $4\mu$ magnetic coatings the achievable recording density is about 2,000 bits per inch. However, there is a growing demand for magnetic discs which permit an even higher recording density whilst retaining an output signal which is suitable for further processing. If these very thin magnetic coatings are used, the heads, which fly on a layer of air which is present between the magnetic disc and the head, have to be brought closer to the recording medium. In the case of magnetic discs which have a magnetic layer about $1\mu$ thick, the distance between the flying head and the disc surface is so small (the distance being only from 0.2 to $0.6\mu$) that the recording surface must be extremely flat. Moreover, the thickness of the magnetic layer of such disc memories must be absolutely constant. A varying thickness of the magnetic layer, and surface irregularities and coating streaks must be avoided since even minute irregularities in the surface of the magnetic layer can interfere with the flying behavior of the head and lead to a non-uniform signal level and/or can cause the head to strike the disc and hence give rise to faulty operation.

It is known to manufacture disc memories by coating an aluminum disc with a fluid dispersion which contains a magnetizable material finely dispersed in a curable binder, and subsequently drying and/or curing this coating and, if desired, also grinding and/or polishing it. A coating technique which has proved particularly successful is the spin-coating process, in which the base disc is caused to rotate and the coating mixture is allowed to flow onto it, as is described, e.g., in U.S. Pat. No. 3,198,657. Other known possible methods of applying the dispersion are based on immersing the base disc in the fluid coating mixture or spraying the mixture onto the disc. To achieve a thin magnetic layer, the excess dispersion which has been applied is then spun off.

None of the conventional processes prevents the formation of coating streaks. The high rotational speeds, which are required to produce particularly thin magnetic layers, favor the formation of coating streaks which resemble a bucket wheel. It is usual, after curing, to finely polish the surface of the magnetic layer in order to even out irregularities and produce a magnetic layer of constant thickness. However, it has been found that these coating streaks cannot be removed, even by the most intensive polishing treatment, to such an extent that a usuable disc memory is produced.

It is an object of the present invention to provide an improved apparatus for the manufacture of magnetic discs carrying thin magnetic layers, in which the base discs are spin-coated whilst avoiding the formation of the coating streaks which usually occur in the production of thin layers.

We have found that this object is achieved and that thin magnetic layers, free from coating streaks, for magnetic discs can be produced by applying a pourable dispersion of a finely divided magnetic pigment in a solution of an organic binder in a volatile solvent, distributing the dispersion over the disc surface to form a thin layer thereon, by rotating the base disc, and drying and curing the layer, if means for producing an aerodynamic boundary layer above the disc during rotation of the latter are arranged above the side of the base disc bearing the applied dispersion.

In particular, we have found that the object of the invention is achieved in a very advantageous manner if a rigid covering element whose surface area is at least equal to that of the base disc is located at a distance of up to 20 mm above the surface of the base disc which is to be coated; this covering element, when also caused to rotate, produces the aerodynamic boundary layer which achieves the effect provided by the invention.

In a preferred embodiment of the invention, two base discs to be provided with a magnetic layer are arranged at a distance of up to 20 mm from one another and the dispersion is applied simultaneously to the two sides facing each other, and the two magnetic layers are produced by subsequent rotation within the aerodynamic boundary layer which is formed.

In the production of magnetic coatings for magnetic discs, a suitable method has proved to be to pour the dispersion, containing the magnetic pigment, radially onto the slowly rotating base disc and then to distribute the dispersion over the base disc by rotating it at high speed.

Suitable magnetic dispersions are the conventional dispersions which usually contain finely divided magnetic pigments, (e.g. gamma-iron (III) oxide, magnetite or ferromagnetic metal) with particle sizes of from about 0.2 to $1\mu$, and binders, especially heat-curable binders, e.g. epoxy resins, phenoxy resins, aminoplast precondensates, polyester resins, polyurethanes or polyurethane-forming compounds, or mixtures of such binders with one another or with other binders, such as polycarbonates or vinyl polymers, e.g. vinyl choride or vinylidene chloride copolymers or heat-curable acrylate or methacrylate copolymers. In general, the magnetic dispersions also contain volatile solvents to produce a dispersion which can readily be poured or sprayed through nozzles, e.g. tetrahydrofuran, toluene, methyl ethyl ketone and the like, the type of solvent used depending, inter alia, on the binder employed. Suitable magnetic dispersions for the process of the invention preferably have viscosities of from about 40 to 200 cp, preferably 60 to 150 cp (measured in a Rheomat 15, Model No. RM 15 C/01, manufactured by Messrs. Contraves, Zurich, Switzerland). The weight ratio of magnetic pigment to binder is generally from 2 to 10:1, especially from 3 to 5:1. The magnetic dispersions can be produced by conventional methods using conventional additives, e.g. dispersing agents and lubricants.

After cleaning the base discs with solvent, the magnetic dispersion is advantageously applied or sprayed from nozzles by the spin-coating process, wherein an excess of magnetic dispersion is sprayed onto the disc from nozzles which can be moved parallel to the disc surface over the radius of the disc; during spraying, the nozzles move from the inner edge to the outer edge of the disc or preferably from the outer edge to the inner edge and then from the inner edge to the outer edge. As is well known, during spin-coating the discs rotate at a speed of from 400 to 3,500 rpm, the speed selected in each particular case depending, inter alia, on the viscosity of the magnetic dispersion and the desired thickness of the resulting magnetic layers. The thickness of the finished dried magnetic layers is in the range of from 1 to $10\mu$ and in particular of from 1 to $3\mu$, the thinner magnetic layers being produced by selecting high rotational speeds, at least during spinning off the excess dispersion, and/or selecting low viscosities of the magnetic dispersions.

Because of the conditions employed in producing very thin magnetic layers, the formation of coating streaks which have the appearance of a bucket wheel is unavoidable. In the case of the desired layer thicknesses, such streaks cannot be removed, even by an intensive polishing treatment, to such an extent that the signal level exhibits the required uniformity.

The apparatus according to the invention employs means which produce an aerodynamic boundary layer above the disc to be coated, as a result of which extremely uniform thicknesses and flat surfaces are achievable even in the case of very thin layers.

If a disc rotates in a stationary air space, a flow of air is produced on each side of the disc, and the radial, tangential and axial components of this flow can be determined by means of the Navier-Stokes equations. Immediately above the surface of the disc, a boundary layer is formed, within which the air closest to the disc surface is stationary relative to said surface, i.e., rotates with the disc.

The boundary layer according to the invention is distinguished by much greater stability and thickness, being stationary, with respect to the rotating disc, over the entire distance between the coated base disc and the covering element. This ensures that the applied layer is not adversely affected by the air flow whilst it is still fluid or is drying slowly.

The mathematical relationship which apply to three-dimensional boundary layers are discussed in detail in "Advances in Applied Mechanics", Vol. IV, Academic Press, 1956, page 159 et seq.

BRIEF DESCRIPTION OF THE DRAWINGS

In FIG. 1, the base disc 1 which is to be coated is fastened by means of holder members 2 and 2' to the drive shaft 3 of a variable-speed electric motor. The dispersion 4 is poured onto the slowly rotating base disc. Thereafter, a covering element 5 is placed upon holder member 2' above the base disc and is consequently caused to rotate together with the holder members 2 and 2'; the motor speed is then raised so as to distribute the dispersion uniformly over the base disc and spin off the excess dispersion.

Figure 1:
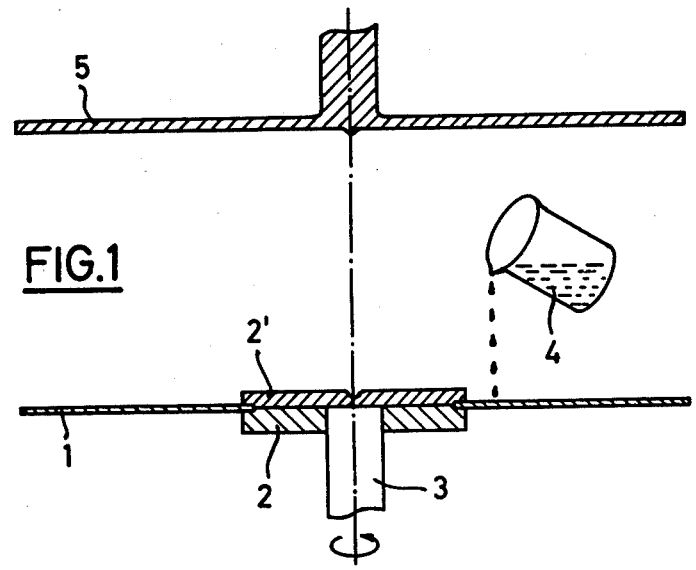
FIG. 1 shows one embodiment of the apparatus of the invention.
Figure 2:
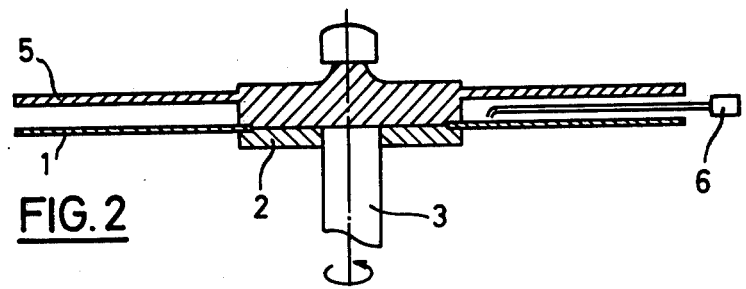
FIG. 2 shows another embodiment of the apparatus of the invention.

Another suitable arrangement for carrying out the technique of the invention is shown in FIG. 2. Here, the base disc 1 is held by a holder consisting of the member 2 fixed on the drive shaft 3, and a further member forming the covering element 5. In this embodiment, the dispersion is applied to the base disc by a nozzle 6 which is movable at right angles to the axis of rotation of the disc. Uniform distribution of the dispersion over the base disc is effected in the conventional manner.

Figure 3:
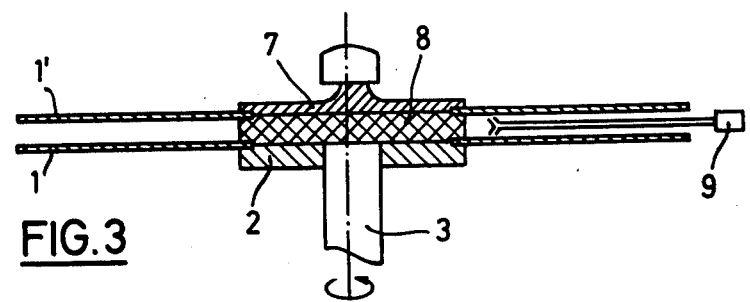
FIG. 3 shows yet another embodiment of the apparatus of the invention.

The embodiment shown in FIG. 3 has proved particularly advantageous. In this case, two base discs 1 and 1' which are to be coated are held on the shaft 3 by means of the members 2 and 7 and the spacer 8 so that each base disc serves as the covering element for the other. This embodiment is particularly economical in view of the fact that the dispersion can be applied simultaneously to two base disc surfaces by means of the radially movable twin nozzle 9.

The embodiments of the technique according to the invention shown in these Figures only represent some of the possibilities. It is obvious, and at times even desirable, that the plane of rotation should not be horizontal, as shown in the Figures, but should be inclined at an angle to the vertical plane, as described, e.g., in German Pat. No. 2,157,650. Furthermore, the rigid covering element used in the technique of the invention does not have to be in the form of a flat disc but can for example be profiled on the side facing the surface of the base disc to be coated. It is possible to employ, instead of the covering element, means which generate a rotating column of air above the side of the disc which is to be coated, this column corresponding to an axial extension of the aerodynamic boundary layer by several orders of magnitude.

The advantageous effect of the technique of the invention is shown by the Example which follows and a comparative experiment. In these, parts and percentages are by weight, unless stated otherwise. Parts by volume bear the same relation to parts by weight as the liter to the kilogram.

EXAMPLE

A mixture of 35,000 parts of acicular gamma-iron (III) oxide of average particle size from 0.2 to $1\mu$, 4,200 parts of a 50% strength solution of a commercial polycondensate of 2,2-(hydroxyphenyl)-propane and epichlorohydrin, having a melting point of from about 125° to 135° C. and epoxy equivalent weight from about 1,900 to 2,500, in a mixture of 70% of cyclohexanol and 30% of xylene, 85 parts of a commercial polysiloxane solution, 3,000 parts of toluene and 260 parts of hexanone is dispersed for 40 hours in a porcelain ball mill having a capacity of 30,000 parts by volume and containing 18,000 parts of steatite balls. After adding 700 parts of a commercial curable allyloxybenzene-formaldehyde condensate having a molecular weight of about 320, 640 parts of Luwipal 030 (Registered Trademark of BASF Aktiengesellschaft, 6700 Ludwigshafen, Germany) as a melamine-formaldehyde condensate in the form of a 55% strength solution in equal parts of n-butanol and xylene, 500 parts of a 70% strength solution of polyvinyl methyl ether in toluene and 6,000 parts of a mixture of equal parts of hexanone, toluene and butyrolactone, the mixture is dispersed for a further 15 hours. Shortly before the end of the dispersing treatment, 660 parts of fused alumina paste are also added and the dispersion is filtered through a 5μ filter paper.

To produce the magnetic layer, the dispersion is applied, by the process of German Pat. No. 2,157,650, to both sides of a previously cleaned aluminum disc rotating in an inclined plane, flat covering discs which rotate with the aluminum disc being mounted on both sides of the latter. The diameter of the covering discs corresponds to that of the base disc, the distance between them and the base disc being 4 mm. The dispersion is supplied through 2 tubular nozzles in a manner similar to that shown in FIG. 2. The excess magnetic dispersion is spun off by increasing the speed of rotation of the disc, and of the covering elements coupled therewith, to about 2,000 rpm for a period of 5 seconds, and a uniform, streak-free coating is obtained on each side of the base disc. The coatings are then cured in a heating zone at 220° C., after which they are polished. The resulting magnetic layers are about 1.6μ thick.

COMPARATIVE EXPERIMENT

For comparison, an aluminum base disc is coated with the dispersion described in the Example, using the conventional coating process, without a covering disc, and is then further processed as described in the Example.

The discs produced in accordance with the Example and in accordance with the Comparative Experiment were subjected to the following tests.

Visual Assessment

The disc produced in accordance with the Example exhibits a completely uniform, streak-free surface, whilst the disc produced in the Comparative Experiment shows unmistakable coating streaks having the appearance of a bucket wheel.

Flying Characteristics

The flying characteristics were assessed on a conventional test apparatus. The magnetic disc to be examined rotates at 3,600 rpm on a test drive unit. A test head equipped with an acceleration transducer flies above the disc at a height of about 0.75μ and is pushed radially over the surface of the disc during the test. Each irregularity in the disc surface causes a deflection of the test head from its steady flight path. The accelerations associated with these deflections produce electrical signals which are integrated over the test area and are defined as a flight index. A streak-free surface accordingly has a flow flight index.

The magnetic disc produced in accordance with the Example had a relative flight index of 1 (with reference to a reference disc), whereas the magnetic disc produced according to the Comparative Experiment had a relative flight index of 2.5.

Uniformity of Signal Level

To determine the uniformity of the signal level, the waveform of the written signal is recorded. The magnetic disc rotates at 3,600 rpm on a test drive unit having a flying head. The particularly critical outer track is written with a signal having a frequency of 3.2 Mc/s and the playback signal (read voltage $U_A$) is shown as a function of the recording distance S. From the application point of view, the waveform should be as free from modulation as possible, since this implies uniform electromagnetic properties over the entire length of the track.

Figure 4:
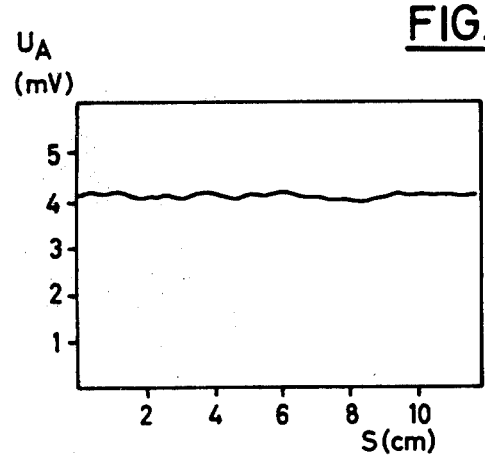
FIGS. 4 and 5 show the waveform of a magnetic disc produced by the inventive apparatus and the prior art, respectively.
Figure 5:
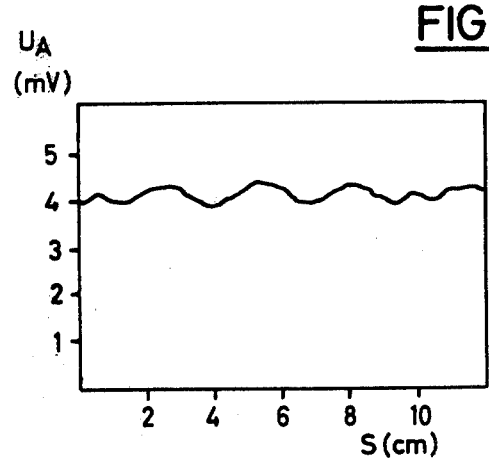

FIG. 4 shows the waveform of a magnetic disc produced by the technique of the invention, whereas FIG. 5 shows the waveform of a prior art magnetic disc.

We claim:
1. An apparatus for spin coating, in the production of thin magnetic layers for magnetic discs, a rigid base disc with a pourable dispersion of magnetic materials in a binder mixture, said apparatus comprising:
   a rigid, generally disc-shaped member mounted for rotation coaxially with and in spaced parallel-planar relationship to said base disc so as to define between the flat surface of said base disc, on which said magnetic layer is to be formed, and the opposing flat surface of said member a generally cylindrical air space open along its entire circumference, through which open circumference excess dispersion is spun off;
   nozzle means extending into said air space from the outside thereof adjacent to said surface of the base disc, for movement at right angles to the axis of said member and said disc so as to apply said dispersion to the last-mentioned surface; and
   means for rotating said member together with said base disc during the spin coating operation so as to cause the air column extending in said space between said two flat surfaces to rotate, in the manner of an aerodynamic boundary layer, in a substantially stationary relationship to the surface of said disc, whereby the formation of surface irregularities during the production of said magnetic layer is substantially avoided.

2. An apparatus as set forth in claim 1, wherein said disc-shaped member has a surface area which is at least equal to that of the base disc and wherein said member is mounted for rotation coaxially with said base disc at an axial distance of up to 20 mm with respect thereto.

3. An apparatus as set forth in claim 1,
   wherein said disc-shaped member is itself a base disc, the two base discs being coaxially mounted for rotation at an axial distance of up to 20 mm from one another so as to define said air space therebetween, and
   wherein said nozzle means include two nozzles extending into said air space from the outside thereof adjacent the mutually facing surfaces of said two base discs, respectively, for movement at right angles to the axis of said two discs so as to apply said dispersion simultaneously to said mutually facing surfaces, respectively;
   said rotating means rotating said two discs together so as to so as to cause the air column extending in said space between said two flat surfaces to rotate, in the manner of an aerodynamic boundary layer, in a substantially stationary relationship to said surfaces, whereby the formation of surface irregularities during the production of the corresponding magnetic layers is substantially avoided.

4. An apparatus for spin coating, in the production of thin magnetic layers for magnetic discs, a rigid base disc with a pourable dispersion of magnetic materials in a binder mixture, said apparatus comprising:
   variable-speed drive means for rotating said base disc, means for applying said dispersion to said base disc while said drive means are rotating said disc at a relatively slow speed, a rigid, generally disc-shaped member, and means for attaching said member to said base disc for rotation therewith and in closely spaced parallel-planar relation thereto at least while said drive means rotate said disc at a relatively high speed during the spin-coating operation, so as to define between the flat surface of said base disc, which carries said dispersion, and the opposing flat surface of said member, a generally cylindrical air space open along its entire circumference, through which open circumference excess dispersion is spun off, and cause the air column extending in said space between said two flat surfaces to rotate, in the manner of an aerodynamic boundary layer, in a substantially stationary relationship to the surface of said disc, whereby the formation of surface irregularities during the production of said magnetic layer is substantially avoided.

* * * * *